June 3, 1924. Re. 15,853
M. VERNAY
MACHINE FOR RUBBING TISSUES
Original Filed Sept. 2, 1921
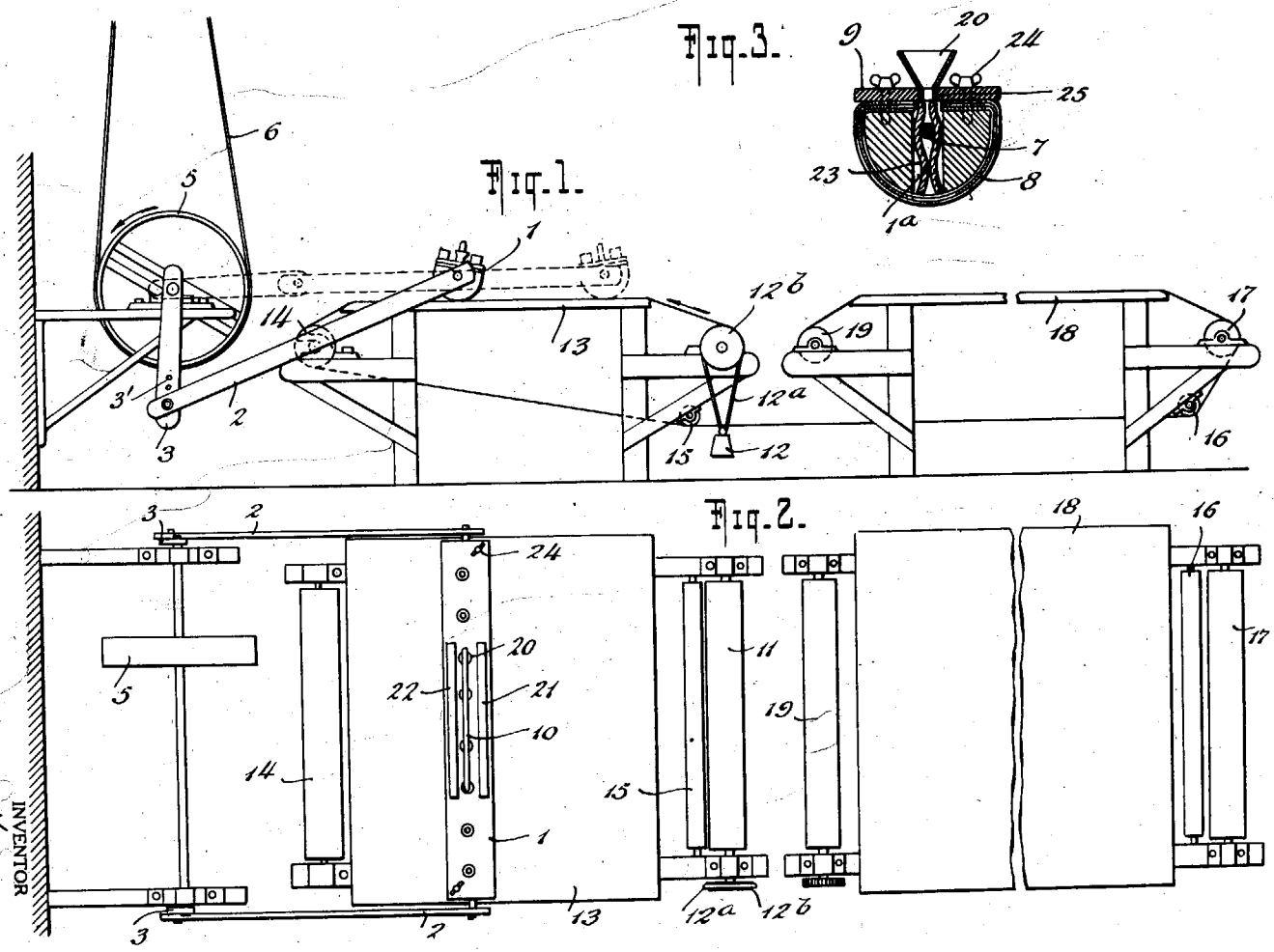
INVENTOR
MARIUS VERNAY
BY Richards & Geier
ATTORNEYS Reissued June 3, 1924.

Re. 15,853

UNITED STATES PATENT OFFICE.

MARIUS VERNAY, OF CORNILLON-BEAUJEU, FRANCE, ASSIGNOR TO ERNEST CADGÈNE, OF PATERSON, NEW JERSEY.

MACHINE FOR RUBBING TISSUES.

Original No. 1,426,690, dated August 22, 1922, Serial No. 497,943, filed September 2, 1921. Application for reissue filed January 4, 1924. Serial No. 684,422.

*To all whom it may concern:*

Be it known that I, MARIUS VERNAY, a citizen of the French Republic, and resident of Cornillon-Beaujeu, Department of Rhone, France, have invented certain new and useful Improvements in Machines for Rubbing Tissues (for which I have filed an application in France, October 7, 1913, No. 473,709; Switzerland, December 24, 1918, No. 82,415; and Austria, September 1, 1920), and of which the following is a specification.

In the dyeing of silk fabrics, it is necessary with certain classes of goods or colors, to rub the fabric after it leaves the dyeing machine, with a felt or other suitably covered rubbing member which is saturated with a rubbing composition, or liquid, usually consisting of a solution of benzine or benzine and oil, so as to remove spots due to uneven saturation of the fabric by the dyeing material, to equalize the tint or color of the dyed fabric and also to restore the sheen, brilliancy and softness of the silk. This rubbing operation has heretofore always been done as a hand labor or manual operation and consequently has not only been a slow and laborious task, but has also added materially to the final cost of the dyeing. While numerous attempts have been made to devise a machine for performing this rubbing operation, such attempts have heretofore proven unsuccessful.

The present invention has for its object to provide a machine by means of which the rubbing operation can be successfully performed.

Said machine is diagrammatically shown in the accompanying drawings in which Fig. 1 is an elevation, Fig. 2 is a plan view and Fig. 3 is a detail sectional view of the construction of a rubbing member.

Referring to the drawings, the numeral 1 designates a rubbing member which rests upon and extends transversely across a supporting table 13, over which the fabric is drawn longitudinally from a supply roller 11, rotatably supported in suitable bearings secured to the table. The fabric is drawn from roller 11 by a take-up roller 19, mounted on an inspection table 18 and driven by any suitable means. A plurality of idler rolls 14, 15, 16 and 17 are rotatably mounted on the tables 13 and 18 and serve to guide the fabric in its passage (as shown by the arrows in Fig. 1) from the top of table 13, then under the tables 13 and 18 and finally across the top of table 18, to the take-up roller 19. A weight 12 which is suspended by means of a suitable cord 12ª from a pulley 12ᵇ on roller 11 serves to keep the fabric under tension as it is drawn across the tables. A reciprocating movement in the direction of travel of the fabric is given the rubbing member 1 by means of two connecting rods suitably secured to said member, and to the two crank rods 3, secured to the shaft 4, having the pulley 5, secured thereto and about which pulley the belt 6, leading to any suitable source of power is trained.

The rubbing member 1, which is constructed of lead or any other heavy metallic material, is hollow, as shown in Fig. 3, to provide a channel 1ª extending longitudinally substantially the full width of said member and is provided with a shaft 7 to which the connecting rods 2 are pivotally secured. Suitably secured to the outer surface of the member 1, as by means of a plate 9, is a covering formed by a number of layers 8 of absorbent material such as cloth, felt or the like, which constitute the rubbing surface. Plate 9 is provided with a number of spaced apertures 25 in which the funnels 20 are placed to receive the rubbing liquid employed and to feed it to the channel 1ª formed within the rubbing member. Any suitable means such as the wicks 23 for evenly distributing the rubbing composition to the rubbing surface is placed within the channel. Any suitable securing means such as indicated at 24 are provided for fastening the plate 9 to the rubbing member and weight bars 21 and 22, preferably of lead are provided to give additional weight to the rubbing member and to cause it to assume the inclined positions shown in the drawing as it is reciprocated. A handle 10 is also preferably provided so that the operator, by placing his hand upon said handle and exerting pressure thereon, may cause the rubbing member to be pressed against the fabric with greater pressure.

The operation of the machine is as follows, a suitable amount of the rubbing composition or liquid used for treating the fabric is poured into the funnels 20 from which it is led by the capillary action of the wicks 23, and evenly distributed thereby, to saturate the absorbent covering 8. Take-up roller is rotated to draw the fabric from the supply roller 11 across table 13 from which it passes around idler rolls 14, 15, 16 and 17 to table 18, where it is inspected and if necessary given such additional hand "touching up" as may be required. The heavy rubbing member 1 is reciprocated by the connecting rods 2, crank levers 3 and associated parts and moves backward and forward across table 13 from the dotted line to the full line positions. The provision of the weight bars 21 and 22, causes the rubbing member to move to the inclined positions under the effect of the pulling action of the rods 2 and the retarding action, due to the friction between the rubbing surface and the fabric; and the saturated absorbent covering of the rubbing member being pressed firmly against the fabric by the weight of the rubbing member effectually removes all spots and other inequalities of the tints or colors of the fabric, while at the same time restoring the brilliancy and softness to the fabric.

The change of inclination of the rubbing members produced as heretofore described by the combined effect of the weight bars 21 and 22, and the frictional action between the rubbing surface, causes the wear upon the absorbent rubbing surface to be distributed over a larger area and thus enables the absorbent covering to be used for a longer time than if the same part thereof were always in contact with the fabric. This inclination of the rubbing member obviously could also be obtained by securing the connecting arms rigidly to the rubbing member.

The travel or stroke of the rubbing member may be varied by changing the point of connection of the crank arms 3 and connecting rods 2 to any of the holes 3′.

While I have shown and described the wicks 23 for evenly distributing the rubbing liquid to the absorbent covering, such showing is to be considered as illustrative and not limited, as it is obvious that any equivalent means could be employed. It will also be obvious that any suitable means may be employed for reciprocating the rubbing member, that if desired the inspection table may be dispensed with and that various changes in the specific form and construction of the rubbing member illustrated may be resorted to without departing from the spirit of my invention.

Having thus described my invention, what I claim as new and desire to secure by Letters Patent, is:

1. In machines for rubbing tissues the combination of a rubbing member having a wick surrounded by layers of absorbent material, a plate on the plug, funnels, the tubes of which cross the plate and arranged over the wick, a table under the member, and means for giving to the tissue a longitudinal displacement over the table between the latter and the member.

2. In machines for rubbing tissues, the combination of a rubbing member having a wick surrounded by layers of spongious material, a plate on said member, funnels, the tubes of which cross the plate and arranged over the wick, a hand lever in the centre of the plate, heavy lead bars on the plate on each side of the hand lever, a table under the said member, and means for giving to the tissue a longitudinal displacement over the table between the latter and the said member.

3. In a machine for rubbing fabrics after the dyeing thereof to equalize the tints and colors thereof, a supporting structure, means to draw the fabric across said supporting structure, a rubbing member having an absorbent rubbing surface and means to reciprocate said rubbing member in contact with the fabric as it passes across said supporting structure.

4. In a machine for rubbing fabrics after the dyeing thereof to equalize the tints and colors thereof, a supporting structure, means to draw the fabric across said supporting structure, a rubbing member having an absorbent rubbing surface, means to feed a rubbing liquid to said rubbing surface, and means to reciprocate said rubbing member in contact with the fabric as it passes across said supporting structure.

5. In a machine for rubbing fabrics after the dyeing thereof to equalize the tints and colors thereof, a supporting structure, means to draw the fabric across said supporting structure, a rubbing member having an absorbent rubbing surface and means to reciprocate said rubbing member in contact with the fabric as it passes across said supporting structure, and means to cause the line of contact of said rubbing surface with said fabric to be varied as said rubbing member is reciprocated and thereby distribute the wear upon said rubbing surface.

6. In a machine for rubbing fabrics after the dyeing thereof to equalize the tints and colors thereof, a supporting structure, means to draw the fabric across said supporting structure, a rubbing member having an absorbent rubbing surface, means to feed a rubbing liquid to said rubbing surface, said means including means to evenly distribute said rubbing liquid to said surface, and means to reciprocate said rubbing member in contact with the fabric as it passes across said supporting structure.

7. In a machine for rubbing fabrics after the dyeing thereof to equalize the tints and colors thereof, a supporting structure, means to draw the fabric across said supporting structure, a rubbing member provided with a channel extending longitudinally thereof, an absorbent rubbing surface covering the bottom of said rubbing member and contact with said fabric, means within said channel to cause a rubbing liquid to be evenly distributed to said rubbing surface, and means to reciprocate said rubbing member.

In testimony whereof I have affixed my signature.

MARIUS VERNAY.